(No Model.)
J. J. STEDMAN.
DENTAL PLATE.
No. 411,538. Patented Sept. 24, 1889.
Fig. 1.
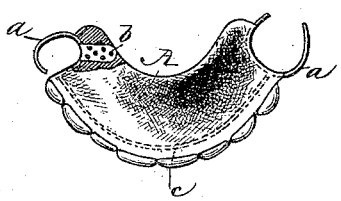
Fig. 2.
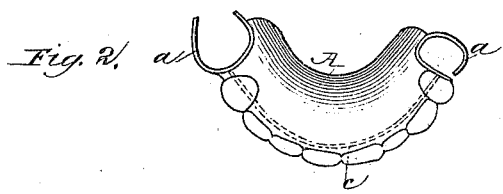
Fig. 3.     Fig. 4.
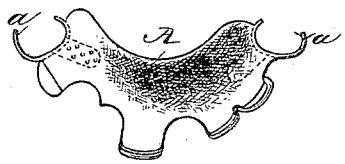 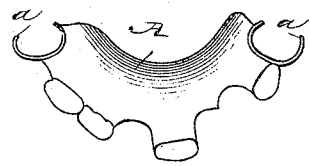
Fig. 5.     Fig. 6.
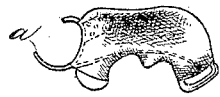 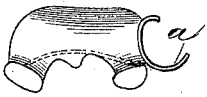
Witnesses
W. Rooster
I. B. Carpenter
Fig. 7.
Inventor
John J. Stedman
By Deines & Fisher
Attys.

UNITED STATES PATENT OFFICE.

JOHN J. STEDMAN, OF LA PORTE, INDIANA.

DENTAL PLATE.

SPECIFICATION forming part of Letters Patent No. 411,538, dated September 24, 1889.

Application filed May 20, 1889. Serial No. 311,404. (No model.)

*To all whom it may concern:*

Be it known that I, JOHN J. STEDMAN, of the city and county of La Porte, State of Indiana, have invented certain new and useful Improvements in Dental Plates, of which the following is hereby declared to be a full, clear, and exact description, sufficient to enable others skilled in the art to which such invention appertains to make and use the same.

The invention relates to the manufacture of partial dentures having a base of vulcanite, and is directed more especially to the preparation of such dentures wherein the base-plate is comparatively narrow and clasps or stays are used to retain the plate in position.

In mounting partial dentures upon bases of gold or silver it is common practice to form and shape the base-plate by separate impression, (with the use of dies, &c., as well understood,) fitting the clasps to the teeth of a counter-model and soldering the clasps to the prepared plate while the latter is mounted in place upon the model. The difficulty of securing accuracy of fit and in joining the clasps to the plate has long been recognized by the profession, and to obviate this trouble it has been proposed to adjust the base-plate (already shaped by separate impression) to the gums in the mouth of the patient, fitting the clasps to the teeth, and then taking a try-plate impression in wax, with the base-plate and clasps *in situ*, the plate and clasps being restored to their position in the wax impression after all are removed from the mouth, and the whole covered with a plaster composition, which, upon setting, serves as a mount or model to sustain the parts while the clasps are being soldered to the base. By such practice the clasps are directly fitted in the mouth to the teeth they are designed to embrace. The imperfections in fit and the risks of breakage are thus avoided which must ordinarily arise were the clasps shaped to the teeth of a counter-model. On the other hand, the base-plate must still be formed at the outset by separate cast and manipulation, and the later try-plate impression, being in wax, is apt to become distorted, while the soldering of clasps to base-plate on the counter-model is almost certain to be inaccurate.

The practical difficulties in manufacture and the discomforts in use of partial dentures having metal base-plates with clasps to retain the same have caused these to be well-nigh abandoned by the profession, although it is fully recognized that such plates, if properly made, are far preferable to the wide plates, (metal or vulcanite,) which depend upon suction only for support in the mouth.

It is the purpose of the present invention to secure by the use of vulcanite, in connection with the retaining-clasps, an improved construction of partial dentures which shall be not only light and easily worn, but by reason of the mode of manufacture shall be of superior merit because of the exceeding nicety of fit rendered possible thereby.

The nature of the improvement will clearly appear from the description following, and be thereafter more distinctly pointed out by claim at the conclusion thereof.

In the accompanying drawings, forming part of this specification, like letters of reference denote like parts of structure throughout.

Figures 1 and 2, 3 and 4, 5 and 6 are top and bottom views, respectively, of various forms of partial dentures constructed in accordance with my invention; Fig. 7, a perspective view of the clasp and stay-plate.

At the outset the clasps $a$ used to retain the base-plate are fitted accurately upon the teeth as they stand in the mouth by means of pliers or like expedient. This manipulation resembles the bending of the clasps about the teeth of a counter-model as commonly practiced in the preparation of partial dentures having metal plates. The clasps are preferably made from gold plate, (No. 23 or 24 standard gage,) and most conveniently, after being properly fitted, are furnished on their lingual side with gold stay-plates, as at $b$, projecting therefrom, and which, when in the base-plate, securely retain the clasps. The stay-plates $b$ may be perforated at several points (and the holes countersunk, if desired) to admit the flow of soft rubber through the perforations to more rigidly fasten the stay-plates in position. The stay-plates $b$ are secured to the clasps $a$ by soldering, and may be so fastened before the clasps are fitted to the teeth, although for greater accuracy of arrangement it is desirable to solder them to the clasps subsequently. The clasps being set in position upon the teeth of the patient and the stay-plates coated on both sides with wax for about the thickness of the plate, the operator then takes the usual plaster impression as commonly practiced. When the impression has set, it is carefully removed from the mouth, bringing the clasps away with it *in situ* as an integral part thereof. Since the clasps are retained with the impression, it is manifest that perfect accuracy in fit and arrangement is secured, the clasps maintaining the same position as they will when the denture is finished. A counter-model is then formed in the ordinary manner, the clasps coming away when the mold is parted and encircling the teeth of the model, the parting of the mold without the risk of breakage or distortion being effected by reason of the wax coating upon the stay-plates, which allows the separation to freely occur.

In making the counter-model care must be taken not to break the plaster where the clasps are attached, and for this purpose it is generally advisable to insert short upright wires in the impression of the teeth embraced by the clasps, so that subsequently on the parting these parts will be stiffened and be less liable to break.

The clasps being in position upon the counter-model, the soft-rubber sheet is laid thereon and the teeth set in place, as is the common practice in the preparation of vulcanite plates. If desired, a wire, of gold or the like, may be embedded in the rubber just behind the teeth and from end to end of the plate, for greater strength. A double filling of rubber may be made where the stay-plates are located, to more firmly hold the same in position. The plate may be trimmed closely, since it is not dependent upon atmospheric pressure to hold it in the mouth. The subsequent manipulation by vulcanizing, polishing, &c., is the same as ordinarily practiced in the art. As thus constructed, partial dentures upon a rubber base-plate are furnished with clasps which for accuracy of fit and set are markedly superior to the older forms, wherein such clasps were secured to metal bases.

The lightness of the rubber and its ease in manipulation enable the dentures to be made with comparative rapidity, and yet, because of the method of manipulation followed, these lose nothing in nicety and comfort of adjustment when in use. It is apparent, also, that partial dentures made in accordance with my invention serve to supplant "bridge-work" in large measure, which latter, as well understood, is difficult to fit and troublesome to the patient to retain, and, besides that, involves oftentimes the destruction or serious impairment of valuable teeth.

Instead of employing plaster for the purpose of taking the impression, softened wax or modeling composition may be substituted therefor, although the use of such materials is attended with more risk of an imperfect and distorted impression and in other respects is less satisfactory than with the use of plaster, which, on all accounts, is to be preferred. To avoid local irritation, it may sometimes be desirable to use flexible rubber as the material for the clasps and stays, although for the most part these fitting are better made from gold.

By embedding several wires or narrow plates of gold along the rubber base-plate, approximately from clasp to clasp, the breadth of the base may be reduced for the comfort of the patient at the same time that the plate is preserved of sufficient strength and rigidity to endure the strains to which it is subjected.

Having thus described my invention, what I claim as new, and desire to secure by Letters Patent, is—

The method of preparing partial dentures having a vulcanite base and retaining-clasps thereon, which method consists in fitting the clasps to the teeth in the mouth, taking an impression with the clasps *in situ*, removing the impression and clasps together, forming a counter-model and transferring the clasps thereto in parting the mold and applying the soft rubber, setting the teeth, and vulcanizing as usual, substantially as described.

JOHN J. STEDMAN.

Witnesses:
DUNCAN M. HUNT,
FRANK E. OSBORN.